(No Model.) 3 Sheets—Sheet 1.

A. WEMPLE.
MACHINE FOR CUTTING GRAIN.

No. 295,699. Patented Mar. 25, 1884.

WITNESSES
H. Engel
Geo. W. King

INVENTOR
Andrew Wemple
By Leggett & Leggett
ATTORNEYS (No Model.) 3 Sheets—Sheet 2.

A. WEMPLE.
MACHINE FOR CUTTING GRAIN.

No. 295,699. Patented Mar. 25, 1884.

WITNESSES
H. J. Engel
Geo. W. King

Andrew Wemple
INVENTOR
By Leggett & Leggett
ATTORNEYS (No Model.) 3 Sheets—Sheet 3.

A. WEMPLE.
MACHINE FOR CUTTING GRAIN.

No. 295,699. Patented Mar. 25, 1884.

WITNESSES

Andrew Wemple.
INVENTOR
By Leggett & Leggett
ATTORNEYS

UNITED STATES PATENT OFFICE.

ANDREW WEMPLE, OF CHICAGO, ILLINOIS, ASSIGNOR TO FERDINAND SCHUMACHER, OF AKRON, OHIO.

MACHINE FOR CUTTING GRAIN.

SPECIFICATION forming part of Letters Patent No. 295,699, dated March 25, 1884.

Application filed May 22, 1883. (No model.)

*To all whom it may concern:*

Be it known that I, ANDREW WEMPLE, of Chicago, in the county of Cook and State of Illinois, have invented certain new and useful Improvements in Machines for Cutting Grain; and I do hereby declare the following to be a full, clear, and exact description of the invention, such as will enable others skilled in the art to which it pertains to make and use the same.

My invention relates to improvements in machines for cutting grain; and it consists in certain features of construction and combinations of parts, hereinafter described, and pointed out in the claims.

Figure 1:
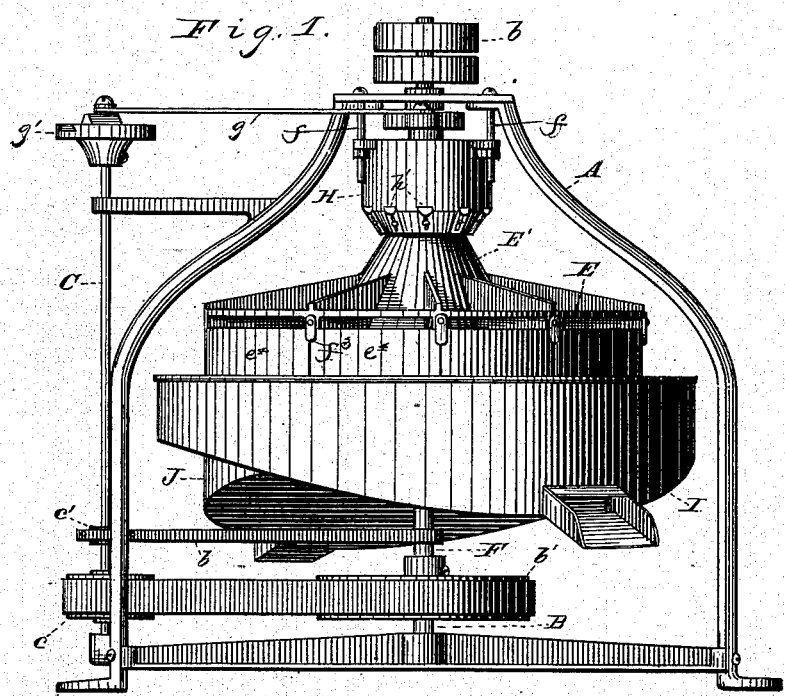
Figure 2:
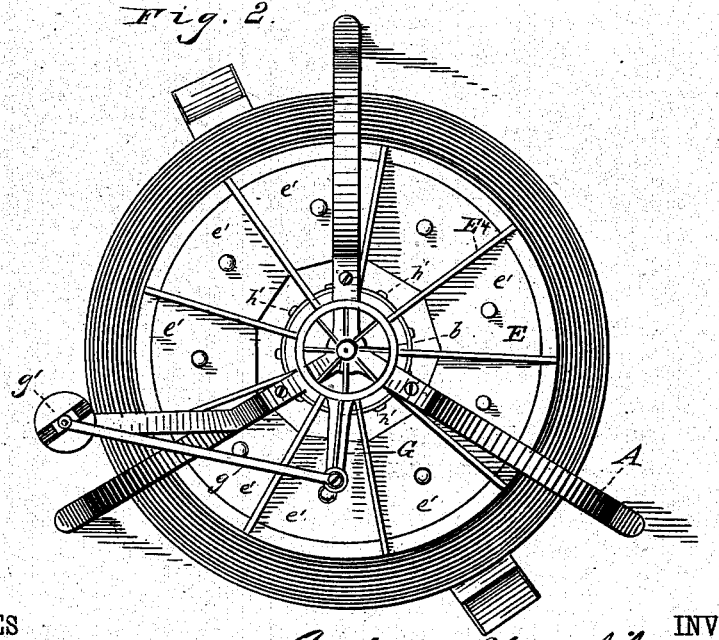
Figure 3:
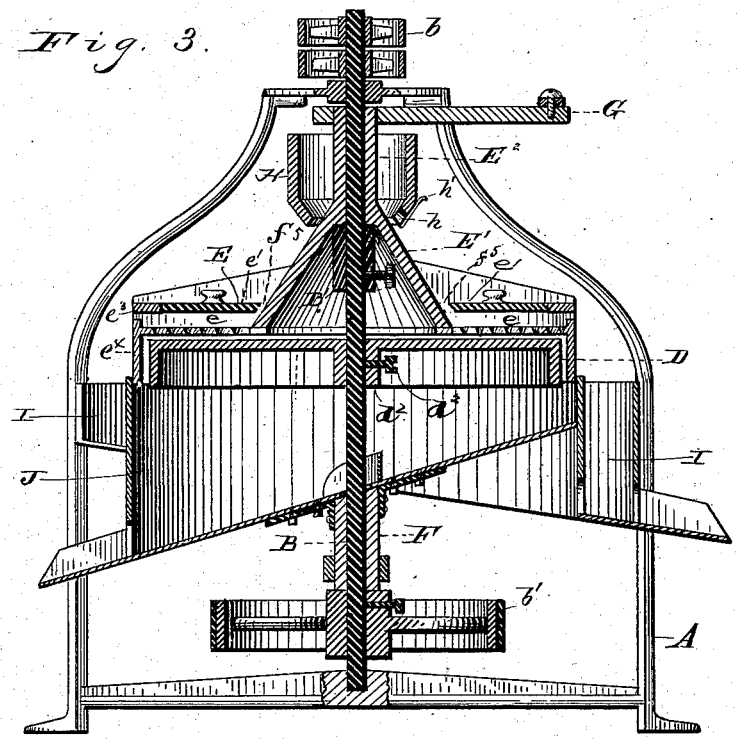
Figure 4:
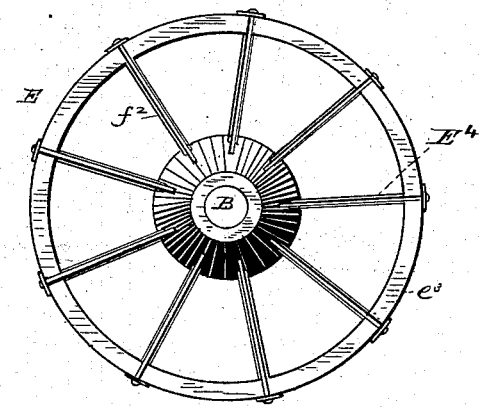
Figure 5:
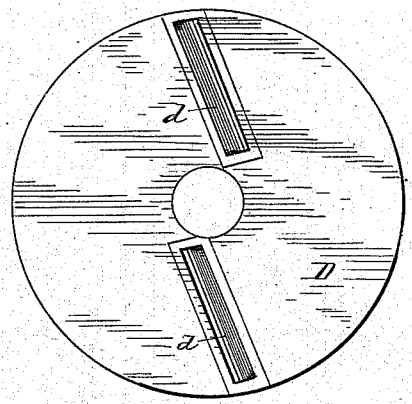
Figure 6:
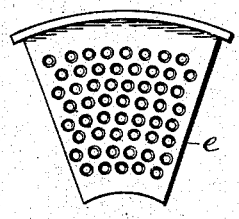
Figure 7:
Figure 8:
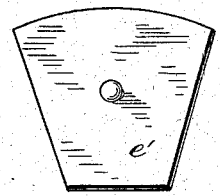
Figure 9:
Figure 10:
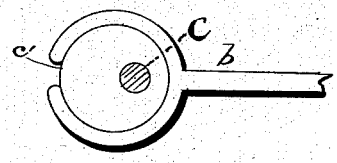

In the drawings, Figure 1 is a view in perspective of a machine for cutting grain embodying my invention. Fig. 2 is a plan view, and Fig. 3 a vertical sectional view, of the same. Fig. 4 is a plan view of the spider with the covers. Fig. 5 is a plan view of the cutting-disk. Fig. 6 is a plan view of one of the feed-plates. Fig. 7 is an edge view of the same with a vertical view of the inside of the flange. Fig. 8 is a plan view of a cover. Fig. 9 is a view in vertical section of a knife and a portion of the cutting-disk; Fig. 10, a section of the shaft C, showing the eccentric $c'$ and the rod $b$.

A represents a frame supporting the two shafts B and C. The shaft B occupies a central position in the machine, and is driven by the pulley $b$, and has attached to it by set-screws or other means the cutting-disk D and the pulley $b'$. The shaft B also guides and supports, without rotating them, certain other devices—to wit, the spider E and the thimble F. The spider E supports the feed-plates $e$ and the covers $e'$, as hereinafter specified, and has a conical hub, E′, extending upward and terminating in the sleeve E², to the upper extremity of which is rigidly attached the arm G. This arm has a vibratory motion that it conveys by means of the said sleeve and conical hub to the spider E and its attachments.

H is a hopper inclosing the said sleeve and the upper portion of the conical hub, and is supported and made vertically adjustable by means of screw-bolts $f$, extending to the frame above. The hopper is designed to set close to the said conical hub, so that no grain can escape except through the slots or openings $h$, which are in number equal to the number of the arms E⁴ of the spider E. These slots are each provided with gates or slides $h'$, to regulate the discharge of grain, and are located, respectively, over the spaces between the arms of the said spider. It will be seen that the supply of grain to any of the said spaces between the arms of the spider may be cut off by closing the gate that is above it. As these slots or openings are next to the said hub, the grain will follow down the incline of the hub. The covers $e'$ are fitted between the arms of the spider, and these arms at their outer and upper edges are connected by a rim, $e^3$, that holds these covers in place. The rim $e^3$ and arms E⁴ are connected or united together in any convenient manner, or made integral with each other. These covers do not extend quite to the hub, but leave an unobstructed space, $f^5$, next the hub through, which the grain may pass to the feed-plates below. These feed-plates are perforated with numerous holes, through which the grain may have access to the cutting-disk and the knife. These plates, like the covers, are fitted between and supported by the spider-arms, and are each provided at their outer ends with a flange, $e^4$, as shown in Figs. 1, 3, and 7. These flanges, when the plates are in place, form a continuous band or casing, that extends below the cutting-disk D and prevents the grain from flying to a distance. At the same time this band or casing is far enough removed from the edge of the cutting-disk to admit of a free discharge of the grain downward. This band extends but a short distance above the top of the feed-plates, leaving a space between it and the rim $e^3$, through which light uncut grain or other material may be discharged. These feed-plates and covers may be supported by grooves or small ledges $f^2$, Fig. 4, or other suitable devices, on the said arms, while the plates are held from displacement endwise by small buttons $f^3$ on the ends of the respective arms of the spider, as seen in Fig. 1. The said spider and its attachments are supported by the shaft B, as aforesaid, and preferably by an adjustable collar, B′, on the shaft, by means of which the feed-plates may be adjusted to their proper distance from the cutting-disk D. Heretofore a perforated disk was used instead of these several feed-plates, and usually a continuous cover inclosed the feed-disk. This part of the machine requires frequent attention to keep it clear and in working order, and the frequent stoppages necessary for this purpose rendered this class of machines with a single feed-disk impracticable. My machine with several feed-plates obviates the difficulty just described. When any feed-plate becomes clogged and inoperative, the grain may be shut off from this section, the cover removed, and this feed-plate put in order; meanwhile the balance of the machine is in full and successful operation. The cutting-disk D has a hub, $d^2$, and set-screw $d^3$, by which it is attached to the shaft B, is flat on top, and may have ribs underneath to strengthen the disk; or the disk may have increased thickness toward the hub. The disk is provided with one or more knives, $d$, fastened preferably with a set-screw, $d^4$, and set at an angle of forty-five or more degrees from a vertical line, and set at as great an angle as is practical from a radial line, that the knife may have what is known as a "draw" or "shearing" cut. The perforations of the feed-plates must not extend in radial distance beyond the reach or sweep of the said knife $d$.

I is a circular inclined trough provided with a discharging spout or outlet situated so as to catch the uncut grain, or whatever may be scattered from the feed-plates. Below the said trough, but attached to it, is the circular inclined receptacle J, also provided with a discharging-spout, and so situated as to catch the cut grain. These two receptacles I and J are attached and supported by the thimble F, which in turn rests upon the hub of the pulley $b'$.

To the thimble F is rigidly attached the arm $b$. This arm at the outer end is slotted or divided in such a manner as to embrace a small eccentric or cam, $c'$, on the shaft C, by means of which a vibratory motion is given to the arm $b$ and conveyed to the receptacles I and J, to assist them in discharging their contents. The shaft C is provided with the pulley $c$, and is driven by a belt from the pulley $b'$. The shaft C has attached at the upper end, preferably, an adjustable crank, $g'$, with a pitman, $g$, leading from the wrist thereof to the arm G, by means of which the said arm G receives its vibratory motion before mentioned.

But little need be said of the operation of the machine, as this has been foretold in the description of the machine. Grain from the hopper is fed in proper quantities to the feed-plates below, and by the vibratory motion of the parts is scattered over the entire surface, causing the grain to enter the perforations in these plates when the protruding portions of the grain are sheared off by the knife or knives of the revolving disk. The severed part known as the "cut grain" falls into the receptacle J and is discharged from the machine.

What I claim is—

1. In a machine for cutting grain, the combination, with the spider E and the covers $e'$, of the detachable feed-plates adapted to be cleaned, repaired, or removed from the machine while in operation, substantially as set forth.

2. In a machine for cutting grain, the revolving cutting-disk, segmental detachable feed-plates, and covers therefor, adapted to have one portion of the cover and feed-plates cleaned, removed, and repaired without affecting the successful operation of the machine, substantially as shown and described.

ANDREW WEMPLE.

Witnesses:
FREDERICK C. GOODWIN,
A. E. ARMITAGE.